(No Model.)
A. TÉTRAULT.
DRIVING MECHANISM FOR AGRICULTURAL IMPLEMENTS.
No. 594,444. Patented Nov. 30, 1897.
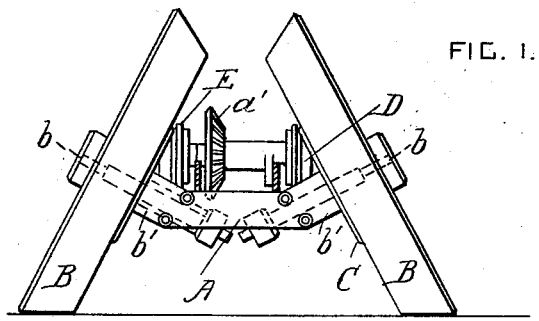
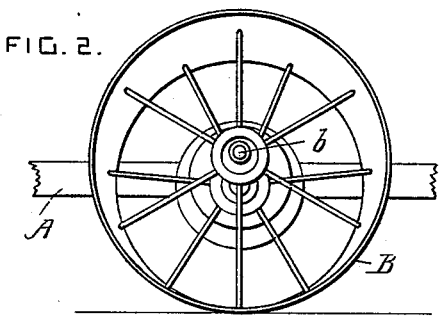
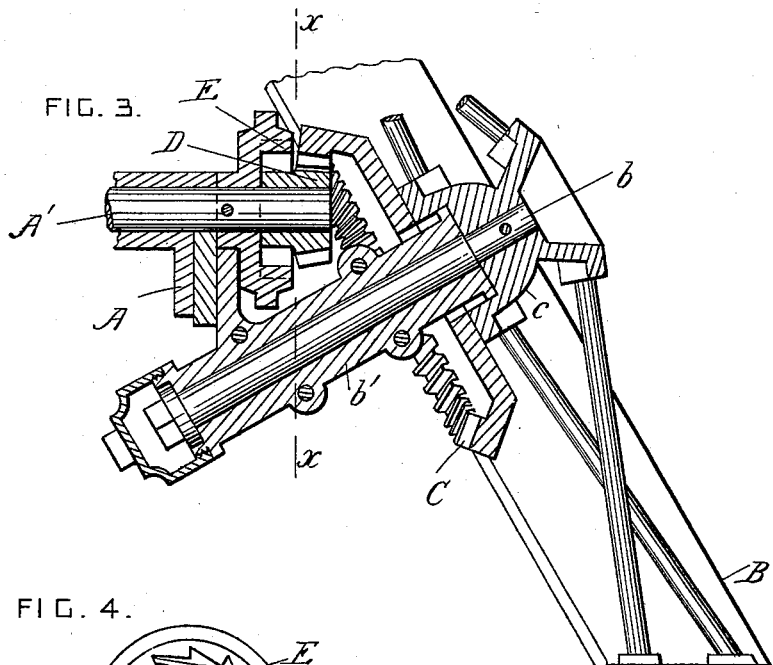
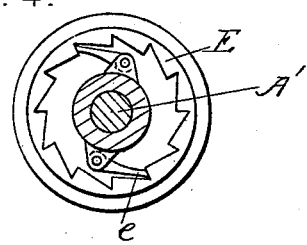
WITNESSES
Amédée Tétrault, INVENTOR
By J. A. Marion
Attorney

United States Patent Office.

AMÉDÉE TÉTRAULT, OF MONTREAL, CANADA.

DRIVING MECHANISM FOR AGRICULTURAL IMPLEMENTS.

SPECIFICATION forming part of Letters Patent No. 594,444, dated November 30, 1897.

Application filed April 5, 1897. Serial No. 630,741. (No model.)

*To all whom it may concern:*

Be it known that I, AMÉDÉE TÉTRAULT, a citizen of the United States, residing at Montreal, in the district of Montreal, Province of Quebec, Canada, have invented certain new and useful Improvements in Driving Mechanism for Agricultural Implements, such as Harvesters; and I do hereby declare the following to be a full, clear, and exact description of the invention, such as will enable others skilled in the art to which it appertains to make and use the same.

This invention relates to the driving mechanism of agricultural implements, such as grain-harvesters; and it consists in the novel construction and combination of the parts hereinafter fully described and claimed.

In the drawings, Figure 1 is a front view of the driving mechanism. Fig. 2 is a side view of the same. Fig. 3 is a vertical section showing one-half of the driving mechanism drawn to a larger scale. Fig. 4 is a cross-section taken on the line $x\ x$ in Fig. 3.

A is a portion of the frame of an agricultural implement, such as a grain-harvester.

$A'$ is a horizontal shaft journaled in the frame A and provided with a driving device, such as a toothed wheel $a'$.

B are the ground-wheels. These wheels have conical treads or faces and they are secured on axles $b$. The axles $b$ are journaled in bearings $b'$ on the frame A and are inclined upwardly and outwardly, so that the lower portions of the rims of the wheels are always horizontal.

C are beveled toothed wheels secured to the hubs $c$ of the wheels B.

D are beveled toothed wheels journaled on the end portions of the shaft $A'$ and gearing into the wheels C.

E are internal ratchet-wheels secured on the shaft $A'$ adjacent to the wheels D, and $e$ are pawls pivoted to the hubs of the wheels D and engaging with the teeth of the wheels E.

When the implement is drawn along, the ground-wheels revolve the horizontal shaft $A'$ through the beveled wheels, ratchet-wheels, and pawls. The ratchet-wheels and pawls permit the implement to be pushed backward without revolving the shaft $A'$ and also permit it to be turned around at the end of a field.

The arrangement of the ground-wheels hereinbefore described provides a very broad wheel-base, and the upper part of the machine is very compact and narrow.

What I claim is—

In an agricultural implement, the combination, with a frame, and a horizontal shaft journaled therein and provided with a driving device; of two conical ground-wheels, two upwardly and outwardly inclined axles journaled in the frame and supporting the said ground-wheels, beveled toothed wheels C operatively secured to the said ground-wheels, beveled toothed wheels D journaled on the said shaft and gearing into the wheels C, internal ratchet-wheels secured on the said shaft, and pawls pivoted to the wheels D and engaging with the said ratchet-wheels, substantially as set forth.

In testimony whereof I have affixed my signature in presence of two witnesses.

AMÉDÉE TÉTRAULT.

Witnesses:
J. A. MARION,
H. T. BULLOCK.